United States Patent
Hashimoto et al.

(10) Patent No.: US 7,501,778 B2
(45) Date of Patent: Mar. 10, 2009

(54) ROBOT CONTROL DEVICE

(75) Inventors: Yoshiki Hashimoto, Hadano (JP); Yoshiyuki Kubo, Yamanashi (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 142 days.

(21) Appl. No.: 11/586,627

(22) Filed: Oct. 26, 2006

(65) Prior Publication Data
US 2007/0096674 A1    May 3, 2007

(30) Foreign Application Priority Data
Oct. 28, 2005    (JP) .............................. 2005-314465

(51) Int. Cl.
*B25J 9/18* (2006.01)
(52) U.S. Cl. ............................ 318/568.11; 318/568.12; 318/568.13; 901/1
(58) Field of Classification Search ............ 318/568.11, 318/568.12, 568.13; 901/1, 3, 20, 46, 4, 901/9; 700/245
See application file for complete search history.

(56) References Cited

U.S. PATENT DOCUMENTS

| 5,705,906 | A | 1/1998 | Tanabe et al. | |
| 2004/0260426 | A1* | 12/2004 | Johannessen et al. | 700/245 |
| 2006/0202556 | A1* | 9/2006 | Tanaka et al. | 307/11 |

FOREIGN PATENT DOCUMENTS

| JP | 56-146198 | 4/1956 |
| JP | 60-037300 | 2/1985 |
| JP | 5-215296 | 8/1993 |
| JP | 7-301397 | 11/1995 |
| JP | 8-166814 | 6/1996 |
| JP | 2000-227982 | 8/2000 |
| JP | 2003-036104 | 2/2003 |
| JP | 2004-017223 | 1/2004 |

OTHER PUBLICATIONS

A Japanese Notice of Reasons for Rejection mailed Oct. 16, 2007 in JP Application No. 2005-314465 (including a partial translation thereof).
Japanese Decision of Final Rejection mailed Feb. 19, 2008 issued in Japanese Application No. 2005-314465 (including a partial translation thereof).

* cited by examiner

*Primary Examiner*—Karen Masih
(74) *Attorney, Agent, or Firm*—Drinker Biddle & Reath LLP

(57) ABSTRACT

A robot control device includes an operation mode change-over switch for switching between a first operation mode for prohibiting an operator from approaching a predetermined area around a robot when power is supplied to a drive motor for driving the robot and a second operation mode for allowing the operator to approach the predetermined area around the robot even when power is supplied to the drive motor, and an electromagnetic contactor for switching the connection and disconnection of the power supply line to the drive motor. The robot can be stopped in case of emergency by using the electromagnetic contactor to disconnect the power supply line. The apparatus further includes an emergency stop control unit. The emergency stop control unit issues a disconnection command to the electromagnetic contactor, when the switching between the first and second operation modes is sensed, and automatically confirms whether or not the power supply line is disconnected.

4 Claims, 3 Drawing Sheets

ROBOT CONTROL DEVICE

BACKGROUND OF THE INVENTION

1. Field of the Invention

The present invention relates to a robot control device and, more particularly, to a robot control device capable of switching between a first operation mode for preventing an operator from approaching a robot working area when power is supplied to a drive motor for driving the robot and a second operation mode for allowing an operator to approach the robot working area even when power is supplied to the drive motor.

2. Description of the Related Art

A robot is generally operated automatically. Therefore, if an operator carelessly intrudes into a robot working area, the operator may collide with the robot. Thus, it is common practice to provide a guard fence or a light curtain around the robot and surround the robot working area with the guard fence or the light curtain to limit the robot working area to within the guard fence or the light curtain. As long as the operator stays outside the guard fence or the light curtain, there is no risk of the operator contacting the robot and the operator's safety is thus insured. Further, in the case where the operator intrudes into the robot working area through the door of the guard fence or the light curtain while the robot is in operation, the robot operation is forcibly stopped to secure the operator's safety.

For example, in the case where a guard fence is used, when a robot control device senses, based on the output from a door switch or a safety plug mounted on the door of the guard fence, that the door of the guard fence is opened, it determines that the operator has entered the area within the guard fence and immediately brings the robot to an emergency stop by cutting off the power supply to the robot. In the case where a light curtain is used, the robot control device senses that light of the light curtain has been intercepted, determines that the operator has entered the area within the robot working area and immediately stops the robot by cutting off the power supplied to the robot.

However, when teaching the robot about an operation, the operator is required to enter the robot working area through the door of the guard fence or the light curtain and perform the teaching job by operating the powered robot through a teaching pendant. Therefore, in addition to an automatic operation mode for sensing the intrusion of the operator into the robot working area and bringing the robot to an emergency stop, it is common practice to provide the robot control device with a teaching operation mode for allowing the robot to be operated without an emergency stop even if the operator enters the robot working area. In the teaching operation mode, the operator can operate an operation mode change-over switch on a fixed operation panel of the robot control device to switch between the automatic operation mode and the teaching operation mode.

In the teaching operation mode, the signal from the door of the guard fence or the light curtain is invalidated even when the door of the guard fence is opened or the operator intrudes into the robot working area through the light curtain, so that the operator can operate the robot from the teaching pendant without stopping the robot as an emergency. In addition, in order to secure the safety of the operator even in the teaching operation mode, as described in Japanese Unexamined Patent Publication No. 8-166814, an emergency stop button and a deadman switch are provided on the teaching pendant, so that the robot can be operated only while depressing the deadman switch. The operator, whenever danger is perceived, can release the deadman switch, or depress the emergency stop button on the teaching pendant, to thereby bring the robot to an emergency stop even in the teaching operation mode.

As described above, the robot can be brought to an emergency by operating the emergency stop button or the deadman switch even in the teaching operation mode. However, in order to positively guarantee sufficient safety of the operator, it is necessary to confirm, before starting the teaching job, that an emergency stop circuit functions normally upon depression of the emergency stop button or operation of the deadman switch. In the prior art, the emergency stop circuit is checked manually by the operator, and therefore the check job is sometimes forgotten or intentionally omitted. As a result, the safety of the operator cannot be secured in some cases where the emergency stop circuit fails and an emergency stop cannot be carried out.

SUMMARY OF THE INVENTION

Accordingly, it is an object of the present invention to provide a robot control device in which the function of the emergency stop circuit is automatically checked without regard to the intentions of the operator.

In order to achieve the object described above, according to the present invention, there is provided a robot control device which includes an operation mode change-over switch for switching between a first operation mode for prohibiting an operator from approaching a predetermined area around a robot when power is supplied to a drive motor for driving the robot and a second operation mode for allowing the operator to approach the predetermined area around the robot even when power is supplied to the drive motor, and a connection/disconnection means for switching the connection and disconnection of a power supply line to the drive motor, the robot being stopped in case of emergency by using the connection/disconnection means to disconnect the power supply line, wherein the robot control device further includes an emergency stop control unit, the emergency stop control unit issuing a disconnection command, to the connection/disconnection means, when the switching between the first and second operation modes by the operation mode change-over switch is sensed, and automatically confirming whether or not the power supply line is disconnected.

The emergency stop control unit of the robot control device according to the present invention automatically confirms that the power supply line is disconnected by the connection/disconnection means in accordance with the disconnection command at the time of switching the operation mode. The connection/disconnection means receives the disconnection command to thereby disconnect the power supply to the drive motor for driving the robot, with the result that the emergency stop of the robot is detected. Therefore, the normal performance of the emergency stop function can be confirmed and the operator is not required to check the emergency stop function manually.

In order to confirm that the power supply line is disconnected by the connection/disconnection means in accordance with the disconnection command, for example, the connection/disconnection means may output a connection/disconnection state signal indicating whether the power supply line is connected or disconnected, and the emergency stop control unit may confirm whether or not the power supply line is disconnected based on the connection/disconnection state signal.

Preferably, the emergency stop control unit issues an alarm when the emergency stop control unit fails to confirm the disconnection of the power supply line in spite of the issuance of a disconnection command to the connection/disconnection means. Also, the emergency stop control unit may prohibit the reconnection of the power supply line by the connection/disconnection means when the emergency stop control unit fails to confirm the disconnection of the power supply line in spite of the issuance of a disconnection command to the connection/disconnection means. This can prevent the operator from operating the robot in the state where the emergency stop function provided by the connection/disconnection means fails to normally work.

According to the present invention, at the time of switching the operation mode, the emergency stop control unit automatically confirms that the connection/disconnection means receives the disconnection command thereby disconnect the power supply to the drive motor. As a result, an emergency stop of the robot can be confirmed and, therefore, the operator is not required to check the function of the emergency stop circuit. Thus, a robot control device higher in safety than in the prior art is provided.

BRIEF DESCRIPTION OF THE DRAWINGS

The above and other object, features and advantages of the present invention will be described in more detail below based on preferred embodiments of the present invention with reference to the accompanying drawings, wherein.

DETAILED DESCRIPTION OF THE INVENTION

Preferred embodiments of the present invention will be described below with reference to the drawings.

Figure 3:
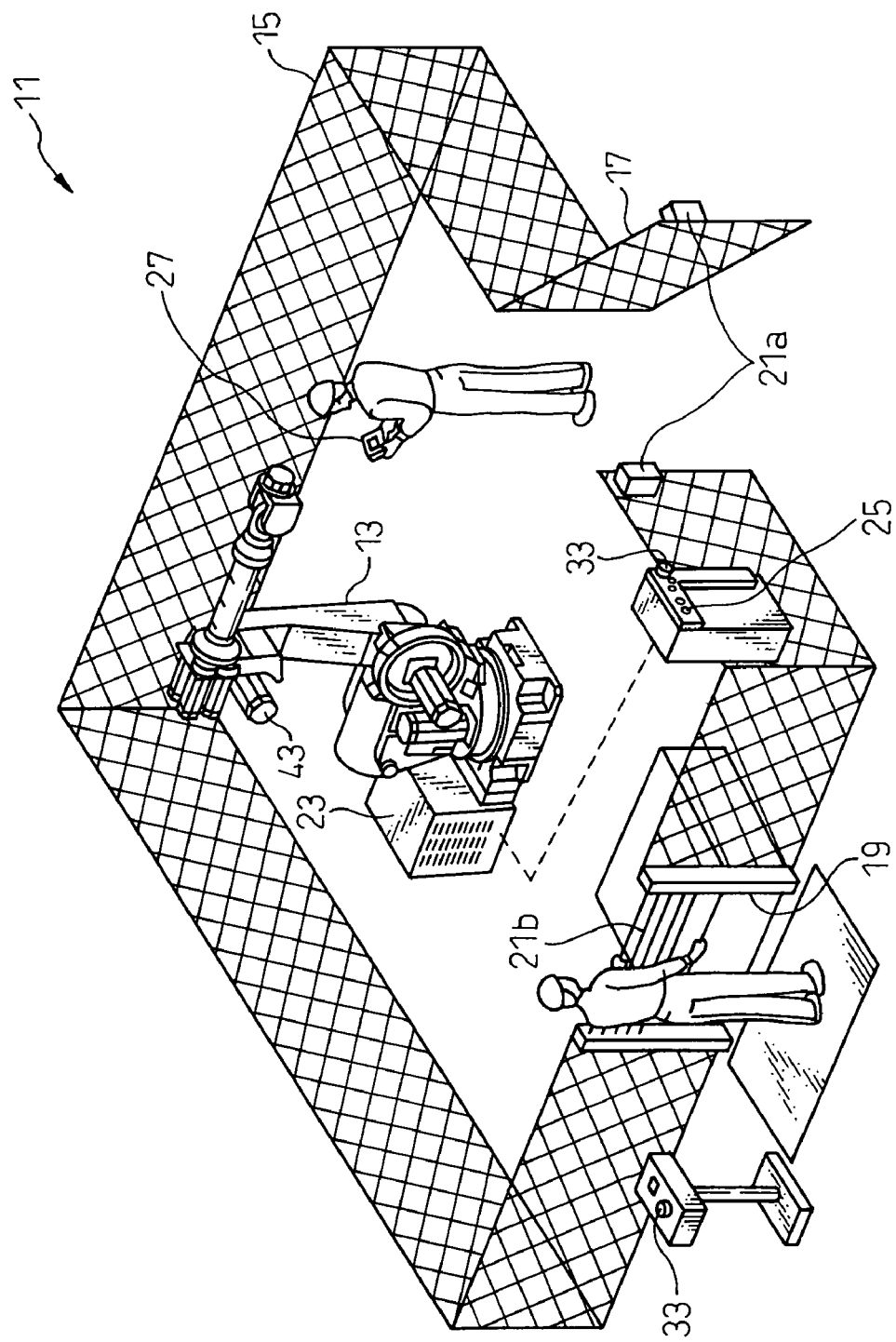
FIG. 3 is a schematic diagram showing a general configuration of a robot cell in which the robot carries out the job.

First, with reference to FIG. 3, a general configuration of a robot cell 11 in which a robot 13 carries out a job will be described. A guard fence 15 is provided around the robot 13, and the working area of the robot 13 is limited to within the guard fence 15. Therefore, as long as the operator is located outside the guard fence, interference between the operator and the robot 13 is avoided. One or more doors 17 or openings 19 through which the operator can enter the robot working area are provided in the guard fence 15. A door switch 21a or a safety plug (not shown) is mounted on the door 17 of the guard fence 15 and is adapted to sense that the door 17 of the guard fence 15 is open. Also, a light curtain 21b is provided at the opening 19 so that the operator passing across the light curtain 21b is sensed by detecting the interception of the light of the light curtain 21b.

Figure 1:
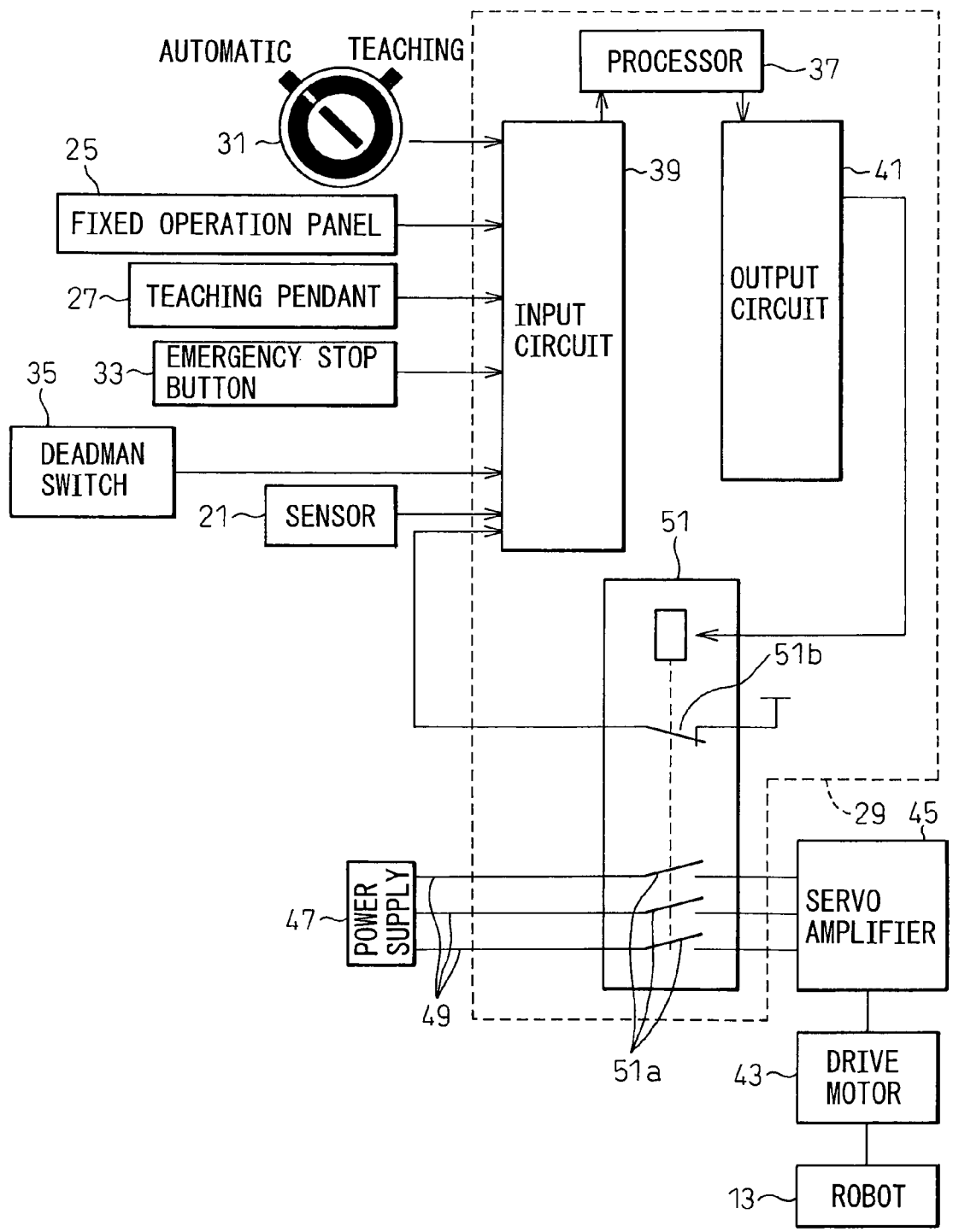
FIG. 1 is a function block diagram showing a general configuration of an emergency stop circuit of a robot control device according to the present invention.

The operation of the robot 13 disposed in the robot cell 11 is controlled by a robot control device 23. The robot control device 23 includes a fixed operation panel 25 for the operator to operate the robot 13 in the normal operation, a teaching pendant 27 for the operator to operate the robot 13 in the teaching job, and an emergency stop circuit 29 (FIG. 1). Also, the robot control device 23 is connected wirelessly or through cable to a sensor 21 such as a door switch 21a or a light curtain 21b of the guard fence 15.

The fixed operation panel 25 is arranged outside the guard fence 15, and can be operated by the operator only when he/she is located outside the guard fence 15. On the other hand, the teaching pendant 27 can be carried by the operator within the guard fence 15 during the teaching job, and is preferably wirelessly connected to the robot control device 23 so as not to obstruct the job. Also, the fixed operation panel 25 is provided with an operation mode change-over switch 31 (FIG. 1) to switch between the automatic operation mode and the teaching operation mode. Further, the fixed operation panel 25 is provided thereon with an emergency stop button 33 to forcibly stop the robot 13 in case of an emergency, and the teaching pendant 27 is provided thereon with an emergency stop button 33 and a deadman switch 35 having a similar function.

The emergency stop circuit 29 of the robot control device 23 is configured of, as shown in FIG. 1, a processor 37 for processing the various signals and commands, an input circuit 39 enabling the processor 37 to read various signals, an output circuit 41 for outputting signals from the processor 37, and an electromagnetic contactor 51 functioning as an connection/disconnection means to switch the connection and disconnection of a power supply line 49 connecting a power supply 47 and a servo amplifier 45 for actuating a drive motor 43 for driving the robot 13.

The input circuit 39 is connected, through a signal cable, with the operation mode change-over switch 31 on the fixed operation panel 25, the emergency stop buttons 33 on the fixed operation panel 25 and the teaching pendant 27 and the sensors 21 such as the door switch 21a of the guard fence 15 and the light curtain 21b. The output signals from these devices are read into the processor 37 through the input circuit 39. The processor 37 determines whether or not the conditions to stop the robot 13 as an emergency are fulfilled, based on the output signals from the sensors 21, the output signals from the emergency stop buttons 33 and the output signal from the deadman switch 35 and, if it is determined that the emergency stop conditions are fulfilled, immediately issues a disconnection command to the electromagnetic contactor 51 through the output circuit 41 to thereby open the electromagnetic contactor 51. As a result, the power supply line 49 is disconnected and the power from the power supply 47 to the servo amplifier 45 is stopped, thereby allowing the robot 13 to be brought to an emergency stop.

The robot control device 23 executes a different process for a different state of the operation mode change-over switch 31. The automatic operation mode is used for automatic operation of the robot 13. In the automatic operation mode, the robot control device 23 receives the command from the fixed operation panel 25 to start or stop the automatic operation. At the same time, the processor 37 of the emergency stop circuit 29 of the robot control device 23 monitors the signal from the sensor 21 such as the door switch 21a or the light curtain 21b of the guard fence 15. When the processor 37 senses the entry of the operator through the guard fence 15 while the power is supplied to the drive motor 43 for driving the robot 13, it determines that the emergency stop conditions are fulfilled and then immediately issued a disconnection command to the electromagnetic contactor 51 to thereby disconnect the power supply line 49 between the power supply 47 and the robot 13 and stop the robot as an emergency. Also, when the emergency stop button 33 on the fixed operation panel 25 is depressed, a process for bringing the robot 13 to an emergency stop is executed in similar fashion.

On the other hand, the teaching operation mode is used for carrying out the job of teaching the robot 13. In the teaching operation mode, the robot control device 23 does not accept the command to start the automatic operation from the fixed operation panel 25, and accepts only the operation command from the teaching pendant 27. Further, the maximum moving speed of the forward end of the arm of the robot 13 due to the operation command is limited to not more than a safe speed of, for example, 250 mm/sec. Also, in the teaching operation mode, in order to allow the operator to operate the robot 13 even when he/she is located within the guard fence 15, the processor 37 of the emergency stop circuit 29 of the robot control device 23 determines that the emergency stop conditions are not fulfilled and does not control the robot 13 for emergency stop, even when it senses the intrusion of the operator through the guard fence 15 based on the output of the sensors 21 provided on the guard fence 15. This is because, in the case where the robot 13 is taught about the operation route, the operator is required to enter the robot working area inside of the guard fence and operate the robot 13 supplied with power.

However, in order to secure safety of the operator during the teaching job, the processor 37 does not disregard but carefully monitors the signals from the emergency stop button 33 and the deadman switch 35 provided on the teaching pendant 27. When the processor 37 senses that the deadman switch 35 is opened or gripped firmly or the emergency stop button 33 is depressed, it determines that the emergency stop conditions are fulfilled and immediately issues a disconnection command to the electromagnetic contactor 51 to thereby disconnect the power supply line 49 between the power supply 47 and the robot 13 and bring the robot 13 to an emergency.

This function to stop the robot 13 in the case of an emergency during the teaching job is very important to secure the safety of the teaching operator, and it is required to positively check that the emergency stop circuit 29 normally operates. However, when the operator is required to manually carry out the check of the operation of the emergency stop circuit 29, the check may be forgotten or intentionally omitted. This is undesirable from the viewpoint of securing the safety of the operator. Therefore, the robot control device 23 according to the present invention further includes a function, added to the processor, of an emergency stop control unit for automatically checking the operation of the emergency stop circuit 29 before starting the teaching job. Further, a type of electromagnetic contactor including an auxiliary monitor contact 51b for outputting a signal indicating the connection/disconnection state of a contact in addition to the operation contact 51a for connecting/disconnecting the power supply line is used as the electromagnetic contactor 51. As shown in FIG. 1, the output of the auxiliary monitor contact 51b is input to the input circuit 39 and read into the processor 37.

Figure 2:
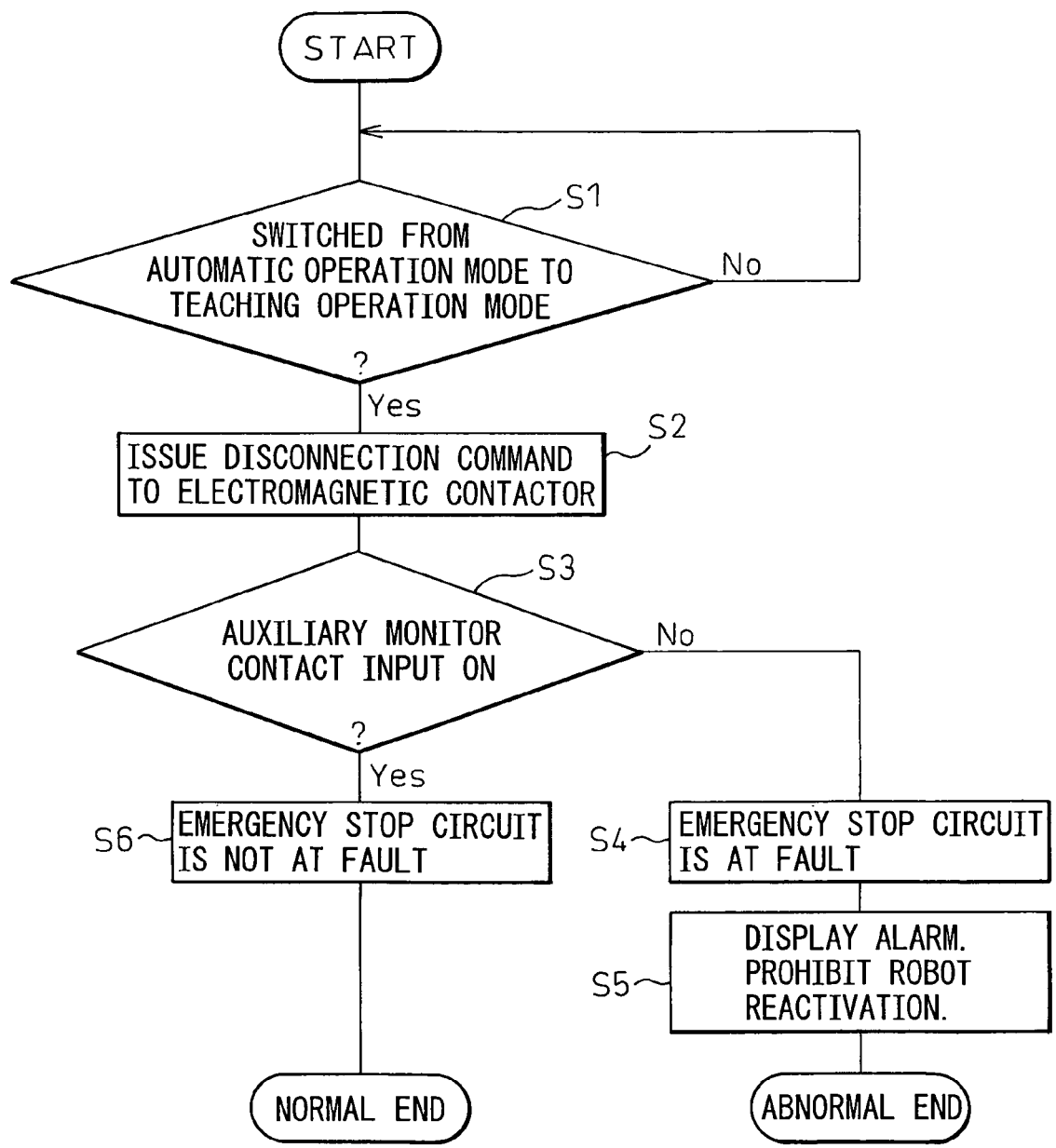
FIG. 2 is a flowchart showing the process of confirming the emergency stop function of the emergency stop circuit shown in FIG. 1.

When the processor 37 functioning as an emergency stop control unit senses, based on a change of the signal from the operation mode change-over switch 31, that the operation mode is switched by the operator, it specifically executes a procedure of confirming the function of the emergency stop circuit 29 as described below with reference to FIG. 2.

The processor 37 of the emergency stop circuit 29 of the robot control device 23, by reading the signal from the operation mode change-over switch 31 on the fixed operation panel 25 through the input circuit 39, always monitors the state of the same switch 31 and senses that the operator switches the operation mode (step S1). Once the operation mode is switched by the operator from the automatic operation mode to the teaching operation mode, the processor 37 issues a disconnection command to the electromagnetic contactor 51 through the output circuit 41 (step S2). The electromagnetic contactor 51, in accordance with the disconnection command, opens the operation contact 51a and disconnects the power supply line 49 between the servo amplifier 45 and the power supply 47 to stop power supplied to the servo amplifier 45.

When the power supply line 49 is disconnected, i.e. the operation contact 51a in the electromagnetic contactor 51 is opened, the auxiliary monitor contact 51b of the electromagnetic contactor 51 is closed (in the on-state). On the other hand, when the power supply line 49 is connected, i.e. the operation contact 51a in the electromagnetic contactor 51 is closed, the auxiliary monitor contact 51b of the electromagnetic contactor 51 is opened (in the off-state). With this, the processor 37, by reading the state of the auxiliary monitor contact 51b through the input circuit 39, confirms whether or not the operation contact 51a of the electromagnetic contactor 51 is opened and the power supply line 49 is disconnected by the electromagnetic contactor 51 in accordance with the command (step S3).

When the auxiliary monitor contact 51b is not closed and remains open in step S3, the processor 37 determines that the emergency stop circuit 29 including the electromagnetic contactor 51 and the driver circuit is at fault (step S4). At this time, the processor 37 displays or outputs an alarm on the fixed operation panel 25 and the teaching pendant 27, and at the same time prohibits the operator from manipulating the teaching pendant 27 to make the electromagnetic contactor 51 in the closed state (in the state where the power supply line 49 is connected), thereby making it impossible for the operator to reactivate the robot 13. As a result, the power supply line 49 is kept disconnected and the drive motor 43 for driving the robot 13 cannot be activated. Thus, the operator cannot perform the teaching job any longer, and therefore the teaching job is prevented from being erroneously carried out while the emergency stop circuit 29 is at fault.

On the other hand, when the auxiliary monitor contact 51b is closed in step S3, the state of the emergency stop circuit 29 being not at fault is confirmed (step S6). In this case, the processor 37 issues a connection command to the electromagnetic contactor 51 if the emergency stop is not output from the emergency stop button 33 or otherwise conditions to stop the robot 13 are not fulfilled. Then, in order to recommence the supply of power to the servo amplifier 45, the electromagnetic contactor 51 makes the operation contact 51a in closed state in accordance with the connection command to thereby connect the power supply line 49 between the servo amplifier 45 and the power supply 47.

Alternatively, the processor 37 may leave the electromagnetic contactor 51 disconnected until the operator performs the operation to reactivate the robot 13 by means of the teaching pendant 27. In this case, the operation for reactivation is performed in the manner described below.

The operator, after switching the operation mode changeover switch to the teaching operation mode and holding the teaching pendant 27, enters into the inside of the guard fence 15 by opening the door 17 of the guard fence 15 or through the light curtain 21b and approaches the robot 13. In order to reactivate the robot stopped as an emergency and start the teaching job, the operator grips the deadman switch 35 of the teaching pendant 27 and depresses the reset key on the teaching pendant 27.

Unless a fault is detected by the operation check of the emergency stop circuit 29 carried out at the time of switching to the teaching operation mode, the processor 37 issues a connection command to the electromagnetic contactor 51 to connect the power supply line 49 between the servo amplifier 45 and the power supply 47. As a result, the supply of power to the servo amplifier 45 is recommenced, so that the robot 13 can again be driven by the drive motor 43. On the other hand, when a fault is detected by the operation check of the emergency stop circuit 29, the processor 37 issues no connection command to the electromagnetic contactor 51 even if the operator depresses the reset key, and an alarm screen is displayed on the fixed operation panel 25 and the teaching pendant 27. As a result, the operator can look at the display on the teaching pendant 27 and recognize that the emergency stop circuit 29 is at fault.

In the case where the auxiliary monitor contact 51b is always recognized as closed due to the fault of the input circuit 39 or always remain closed due to the fault of the auxiliary monitor contact 51b itself, the operation check of the emergency stop circuit 29 may not be carried out accurately. However, this problem can be obviated by confirming that the signal of the auxiliary monitor contact 51b is switched between the on and the off states when the processor 37 issues a disconnection command or a connection command to the electromagnetic contactor 51. For example, unless the signal of the auxiliary monitor contact 51b is changed to the closed state (on-state) from the open state (off-state) when the processor gives a connection command to the electromagnetic contactor 51, the input circuit 39 or the auxiliary monitor contact 51b is determined as at fault, and an alarm is displayed or otherwise issued.

As described above, when the processor 37 functioning as an emergency stop control unit senses that the operator has switched the operation mode change-over switch 31 to the teaching operation mode, it issues a disconnection command to the electromagnetic contactor 51, and only after the fact that the electromagnetic contactor 51 disconnects the power supply line 49 in accordance with the command is confirmed by the signal of the auxiliary monitor contact 51b, allows the operator to reactivate the robot 13. As a result, when the robot 13 can be reactivated for teaching after the operator switches the operation to the teaching operation mode, the function of the emergency stop circuit 29 has already been checked automatically and the absence of a fault has been confirmed, thereby eliminating the need of a conscious check of the emergency stop circuit 29 by the operator. In this way, the function of the emergency stop circuit 29 is positively confirmed prior to the start of a teaching job involving the risk of the robot 13 causing harm to the operator, thereby making it possible to secure a higher safety of the operator.

While the present invention has been described based on preferred embodiments, it is not limited to these preferred embodiments. For example, in the aforementioned embodiments, the emergency stop circuit 29 is checked by the emergency stop control unit when the operation mode is switched from the automatic operation mode to the teaching operation mode. However, the emergency stop circuit 29 can also be checked according to a procedure similar to the above-described procedure when the operation mode is switched from the teaching operation mode to the automatic operation mode or the robot control device 23 is activated. Also, in the embodiments described above, one electromagnetic contactor 51 is used for the emergency stop circuit 9. As an alternative, two or more electromagnetic contactors 51 may be connected in series and the circuit may be multiplied to improve the reliability of the emergency stop circuit 29.

What is claimed is:

1. A robot control device comprising an operation mode change-over switch for switching between a first operation mode for prohibiting an operator from approaching a predetermined area around a robot when power is supplied to a drive motor for driving said robot and a second operation mode for allowing the operator to approach the predetermined area around said robot even when power is supplied to said drive motor, and a connection/disconnection means for switching the connection and disconnection of a power supply line to said drive motor, said robot being stopped, in case of emergency, by using said connection/disconnection means to disconnect said power supply line, wherein said robot control device further comprises an emergency stop control unit, said emergency stop control unit issuing a disconnection command to said connection/disconnection means, when the switching between the first and second operation modes by said operation mode change-over switch is sensed, and automatically confirming whether or not said power supply line is disconnected.

2. The robot control device according to claim 1, wherein said connection/disconnection means outputs a connection/disconnection state signal indicating whether said power supply line is connected or disconnected, and said emergency stop control unit confirms whether or not said power supply line is disconnected based on the connection/disconnection state signal.

3. The robot control device according to claim 1, wherein said emergency stop control unit issues an alarm when said emergency stop control unit fails to confirm the disconnection of said power supply tine in spite of the issuance of a disconnection command to said connection/disconnection means.

4. The robot control device according to claim 1, wherein said emergency stop control unit prohibits the reconnection of said power supply line by said connection/disconnection means when said emergency stop control unit fails to confirm the disconnection of said power supply line in spite of the issuance of a disconnection command to said connection/disconnection means.

* * * * *